United States Patent
Oh et al.

(10) Patent No.: US 8,675,688 B2
(45) Date of Patent: Mar. 18, 2014

(54) APPARATUS AND METHOD OF TRANSMITTING AND RECEIVING WAKE-UP SIGNAL

(75) Inventors: Cheon In Oh, Daejeon (KR); Ho Yong Kang, Daejeon (KR); Kyo Hoon Son, Daejeon (KR); Nae Soo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 940 days.

(21) Appl. No.: 12/613,802

(22) Filed: Nov. 6, 2009

(65) Prior Publication Data

US 2010/0150042 A1    Jun. 17, 2010

(30) Foreign Application Priority Data

Dec. 15, 2008    (KR) .................. 10-2008-0127265

(51) Int. Cl.
*H04J 3/06*    (2006.01)
(52) U.S. Cl.
USPC ........... 370/509; 370/311; 370/389; 370/510; 370/512
(58) Field of Classification Search
USPC .................... 370/311, 389, 509, 510, 512
See application file for complete search history.

(56) References Cited

U.S. PATENT DOCUMENTS

| | | | | |
|---|---|---|---|---|
| 5,535,373 | A * | 7/1996 | Olnowich | 703/25 |
| 6,339,792 | B1 * | 1/2002 | Allison et al. | 709/228 |
| 6,381,229 | B1 * | 4/2002 | Narvinger et al. | 370/328 |
| 7,218,628 | B2 * | 5/2007 | Chiu et al. | 370/349 |
| 7,764,664 | B2 * | 7/2010 | Zeng et al. | 370/349 |
| 2004/0082357 | A1 * | 4/2004 | Moulsley et al. | 455/522 |
| 2004/0190653 | A1 * | 9/2004 | Yasui et al. | 375/345 |
| 2006/0176837 | A1 | 8/2006 | Son et al. | |
| 2008/0157745 | A1 * | 7/2008 | Nakata | 323/304 |
| 2010/0097969 | A1 * | 4/2010 | De Kimpe et al. | 370/311 |

FOREIGN PATENT DOCUMENTS

| | | |
|---|---|---|
| JP | 2008-539004 | 11/2008 |
| KR | 10-2005-0029254 | 3/2005 |
| KR | 10-2008-0033653 | 4/2008 |
| WO | 2006/116004 A1 | 11/2006 |

* cited by examiner

*Primary Examiner* — Christopher Grey
(74) *Attorney, Agent, or Firm* — Staas & Halsey LLP

(57) ABSTRACT

Provided are an apparatus and method of transmitting and receiving a wake-up signal. The method of receiving a wake-up signal includes the following: operating a radio frequency (RF) receiving unit that receives a wireless signal through an antenna during an SFD detecting time, wherein the SFD detecting time is shorter than a predetermined SFD detecting time period, according to the predetermined SFD detecting time period and detecting a start of frame delimiter (SFD) to indicate that the received wireless signal is a wake-up signal to wake-up a node in a sleep mode; and detecting the wake-up signal by continuously operating the RF receiving unit when the SFD is detected. Power consumption that is used to receive the wake-up signal can be reduced.

14 Claims, 10 Drawing Sheets

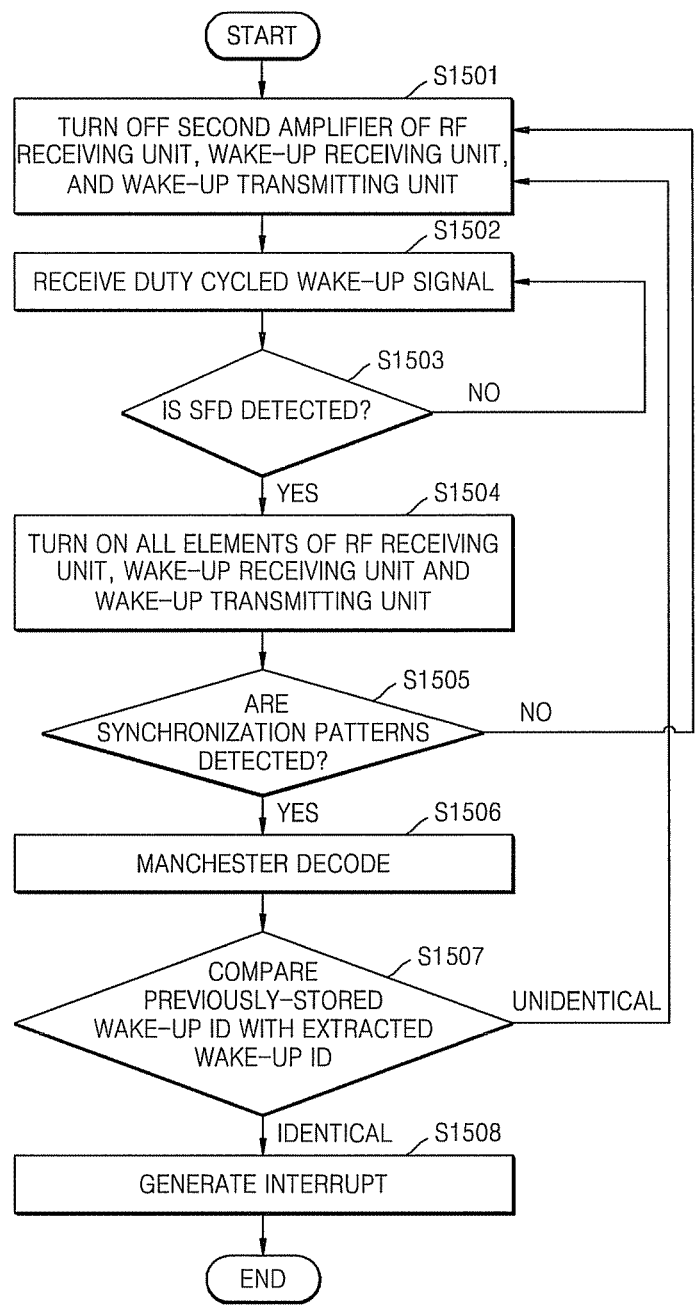

APPARATUS AND METHOD OF TRANSMITTING AND RECEIVING WAKE-UP SIGNAL

CROSS-REFERENCE TO RELATED PATENT APPLICATION

This application claims the benefit of Korean Patent Application No. 10-2008-0127265, filed on Dec. 15, 2008, in the Korean Intellectual Property Office, the disclosure of which is incorporated herein in its entirety by reference.

BACKGROUND OF THE INVENTION

1. Field of the Invention

The present invention relates to an apparatus and method of transmitting and receiving a wake-up signal so as to operate an ultra-low power sensor node, and more particularly, an apparatus and method of transmitting and receiving a wake-up signal by operating a radio frequency (RF) receiving unit for a predetermined amount of time repeatedly according to a predetermined time period to first check whether a signal received is a wake-up signal (before fully operating) so that power consumption required to receive the wake-up signal can be reduced.

2. Description of the Related Art

Generally, the life span of a plurality of sensor nodes used in a wireless sensor network is determined according to power consumption. In order to solve a high power consumption problem that may occur in the sensor nodes, various technologies related to a wake-up signal have been suggested. In conventional technologies related to a wake-up signal, the sensor nodes are in a sleep mode, and a radio frequency (RF) receiving unit that is always in a wake-up mode monitors for a wake-up signal and when a wake-up signal is detected, the mode of the sensor nodes is transited to an active mode in which the main operating unit of the sensor nodes are activated. In this case, the sensor nodes of which the mode is transited to the active mode request packet transmissions of neighboring nodes, and when data reception is completed, the mode of the sensor nodes is transited to the sleep mode again, and the RF receiving unit restarts wake-up signal monitoring.

In the conventional technologies related to a wake-up signal, all portions of a RF receiving unit are always in a wake-up mode and thus, there is a limit in realizing reduced power consumption.

SUMMARY OF THE INVENTION

The present invention provides an apparatus and method of transmitting and receiving a wake-up signal by operating a radio frequency (RF) receiving unit for a predetermined amount of time repeatedly according to a predetermined time period to first check whether a signal received is a wake-up signal (before fully operating) so that power consumption required to receive the wake-up signal can be reduced.

According to an aspect of the present invention, there is provided an apparatus for receiving a wake-up signal, the apparatus including: a radio frequency (RF) receiving unit receiving a wireless signal through an antenna; a start of frame delimiter (SFD) detecting unit detecting an SFD to indicate that the received wireless signal is a wake-up signal that is used to wake-up a node in a sleep mode, by operating the RF receiving unit during an SFD detecting time, wherein the SFD detecting time is shorter than a predetermined SFD detecting time period; and a wake-up signal detecting unit detecting the wake-up signal by continuously operating the RF receiving unit when the SFD is detected.

According to another aspect of the present invention, there is provided a method of receiving a wake-up signal, the method including: operating a radio frequency (RF) receiving unit that receives a wireless signal through an antenna during an SFD detecting time, wherein the SFD detecting time is shorter than a predetermined SFD detecting time period, according to the predetermined SFD detecting time period and detecting a start of frame delimiter (SFD) to indicate that the received wireless signal is a wake-up signal that is used to wake-up a node in a sleep mode; and detecting the wake-up signal by continuously operating the RF receiving unit when the SFD is detected According to another aspect of the present invention, there is provided an apparatus for transmitting a wake-up signal, the apparatus including: a start of frame delimiter (SFD) generating unit generating an SFD indicative of the wake-up signal to wake-up a node in a sleep mode; a data inserting unit inserting synchronization patterns for synchronizing the wake-up signal and a wake-up identifier (ID) indicative of a node to be waken up by the wake-up signal, wherein the data field is separated from the SFD of a frame of the wake-up signal at constant intervals; and a wake-up signal transmitting unit transmitting the frame of the wake-up signal.

According to another aspect of the present invention, there is provided a method of transmitting a wake-up signal, the method including: generating a start of frame delimiter (SFD) indicative of the wake-up signal to wake-up a node in a sleep mode; inserting synchronization patterns for synchronizing the wake-up signal and a wake-up identifier (ID) indicative of a node to be waken up by the wake-up signal, wherein the data field is separated from the SFD of a frame of the wake-up signal at constant intervals; and transmitting the frame of the wake-up signal.

BRIEF DESCRIPTION OF THE DRAWINGS

The above and other features and advantages of the present invention will become more apparent by describing in detail exemplary embodiments thereof with reference to the attached drawings in which:

FIG. 15 is a flowchart illustrating a process of waking-up a sensor node by receiving the wake-up signal, wherein the process is performed by the apparatus for transmitting and receiving the wake-up signal shown in FIG. 10.

DETAILED DESCRIPTION OF THE INVENTION

The present invention will now be described more fully with reference to the accompanying drawings, in which exemplary embodiments of the invention are shown.

The above-described purposes, features, and advantages of the present invention will be clarified with reference to the detailed description related to the accompanying drawings. When describing the present invention, if it is determined that a detailed description of related arts may make point of the present invention unnecessarily vague, the detailed description of the related arts may be omitted or may be briefly done.

Meanwhile, when any portion includes "any element", the portion may not exclude another element but may further include another element unless there are specifically opposed descriptions.

Figure 1:
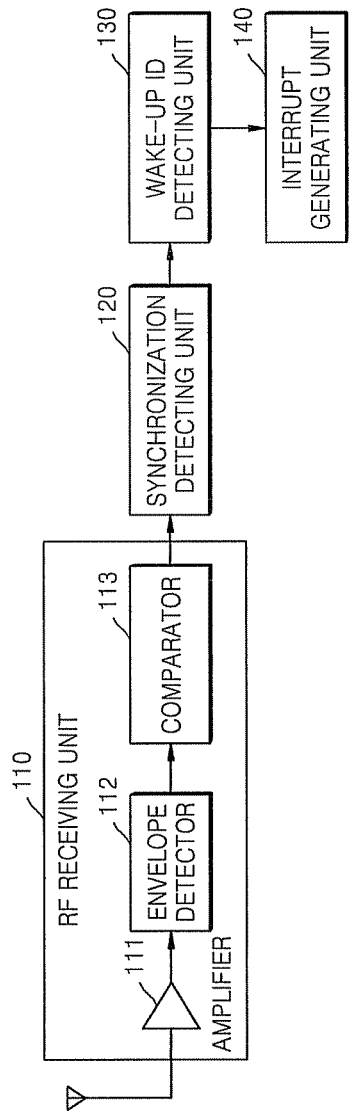
FIG. 1 illustrates a conventional apparatus for receiving a wake-up signal.
Figure 2:
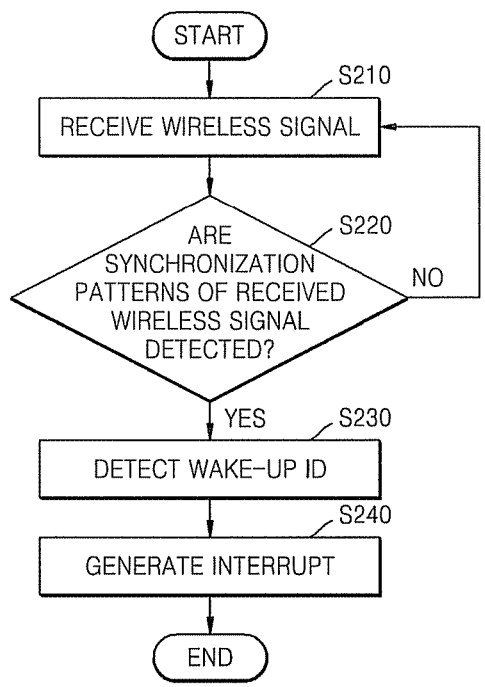
FIG. 2 is a flowchart illustrating a conventional method of receiving a wake-up signal, wherein the method is performed in the conventional apparatus for receiving a wake-up signal shown in FIG. 1.

FIG. 1 illustrates a conventional apparatus for receiving a wake-up signal, and FIG. 2 is a flowchart illustrating a conventional method of receiving a wake-up signal, wherein the method is performed in the conventional apparatus for receiving a wake-up signal shown in FIG. 1. Referring to FIG. 1, the conventional apparatus for receiving a wake-up signal includes a radio frequency (RF) receiving unit 110, a synchronization detecting unit 120, a wake-up identifier (ID) detecting unit 130, and an interrupt generating unit 140.

The RF receiving unit 110 receives a wireless signal from an antenna (S210).

In general, a wake-up signal is transmitted by using an on off keying (OOK) modulation method. In this case, the RF receiving unit 110 includes an amplifier 111, an envelope detector 112, and a comparator 113.

The amplifier 111 amplifies the wireless signal received from the antenna in an analog manner so as to improve reliability of detecting a wake-up signal, and the envelope detector 112 detects an envelope of the received wireless signal to detect the size of the wireless signal in an analog manner.

The comparator 113 determines digital values, i.e., 1 and 0, of the received wireless signal and outputs the digital values. In other words, if a value output from the envelope detector 112 is greater than a predetermined reference value, the comparator 113 determines the digital value as 1, and if the value output from the envelope detector 112 is less than the predetermined reference value, the comparator 113 determines the digital value as 0.

The synchronization detecting unit 120 detects synchronization patterns of the wireless signal output from the RF receiving unit 110 (S220).

If the synchronization patterns of the wireless signal are identical to predetermined synchronization patterns, the wake-up ID detecting unit 130 detects a wake-up ID that is located next to the synchronization patterns in a frame of the wake-up signal (S230).

If the detected wake-up ID is identical to an ID of a node connected to the apparatus for receiving a wake-up signal, the interrupt generating unit 140 generates an interrupt that transits the state of the node to a wake-up state from a sleep state (S240).

Figure 3:
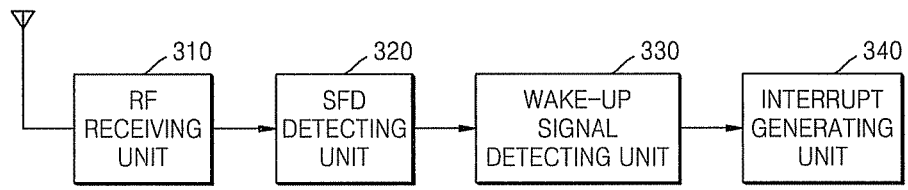
FIG. 3 illustrates an apparatus for receiving a wake-up signal according to an embodiment of the present invention.
Figure 4:
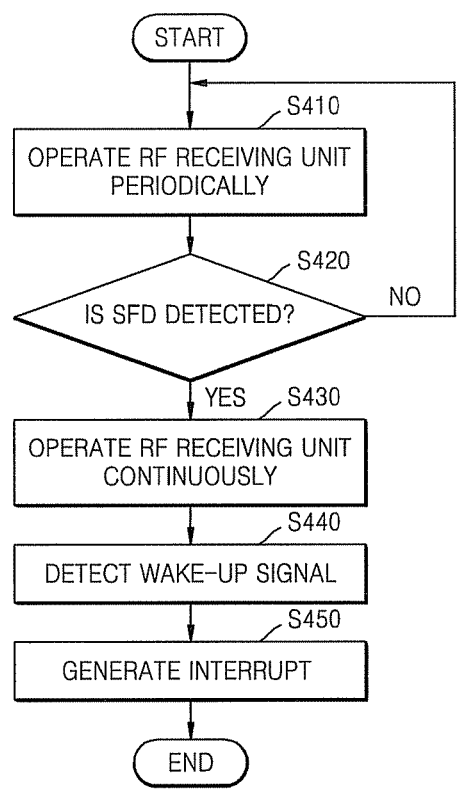
FIG. 4 is a flowchart illustrating a method of receiving a wake-up signal according to an embodiment of the present invention, wherein the method is performed in the apparatus for receiving a wake-up signal shown in FIG. 3.

FIG. 3 illustrates an apparatus for receiving a wake-up signal according to an embodiment of the present invention, and FIG. 4 is a flowchart illustrating a method of receiving a wake-up signal according to an embodiment of the present invention, wherein the method is performed in the apparatus for receiving a wake-up signal shown in FIG. 3. Referring to FIG. 3, the apparatus for receiving a wake-up signal according to the current embodiment includes an RF receiving unit 310, a start of frame delimiter (SFD) detecting unit 320, a wake-up signal detecting unit 330, and an interrupt generating unit 340.

The RF receiving unit 310 receives a wireless signal from an antenna.

The SFD detecting unit 320 operates the RF receiving unit 310 for an SFD detecting time, wherein the SFD detecting time is shorter than a predetermined SFD detecting time period, repeatedly according to the predetermined SFD detecting time period (S410), and detects an SFD to indicate that the received wireless signal is a wake-up signal (S420).

In other words, in the current embodiment, the wireless signal is received in a duty cycled manner. Here, in the duty cycled manner, the RF receiving unit 310 operates for a predetermined amount of time in a predetermined time period, for example, for 10 μs for a time period of 1 ms.

Generally, final output waveforms of the SFD detecting unit 320 and the RF receiving unit 310 are the same. However, in the current embodiment, the final output of the RF receiving unit 310 includes a portion of an original SFD signal.

If an SFD is detected, the wake-up signal detecting unit 330 operates the RF receiving unit 310 continuously (S430) to detect a wake-up signal (S440).

In other words, after an SFD is detected, the wake-up signal detecting unit 330 does not operate in the duty cycled manner and operates the RF receiving unit 310 in such a way as to receive a signal continuously, as in a general system.

Thus, the RF receiving unit 310 may receive a complete wake-up signal.

The RF receiving unit 310 according to the current embodiment may include an amplifier including a plurality of amplification circuits amplifying the received wireless signal. In this case, the SFD detecting unit 320 operates only a portion of the amplification circuits of the amplifier to detect the SFD, and the wake-up signal detecting unit 330 operates all of the amplification circuits of the amplifier to detect a complete wake-up signal.

Since wake-up data such as a wake-up ID is more important than an SFD, when an complete wake-up signal is to be received after an SFD is detected, all of the amplification circuits of the amplifier are operated to improve sensitivity of reception so that the reliability of obtaining the wake-up data is improved.

In other words, a bit string of an SFD is shorter than that of wake-up data. If an SFD or synchronization patterns are falsely detected, then the probability that detection of the synchronization pattern will fail is large. However, power consumption due to an error in detecting of an SFD is relatively little.

However, if the wake-up data is wrongly determined and the sensor node is wrongly waken up, then power consumption is relatively high.

In other words, since an SFD is less important than wake-up data, before an SFD is detected, only a first amplifier of the amplification circuits is operated to reduce power consumption, and after the SFD is detected or when wake-up data is compared, a second amplifier as well as the first amplifier of the amplification circuits is operated to reduce a probability that the sensor node will be wrongly waken up.

In the current embodiment, the amplification circuits are divided into two portions, i.e., first and second amplifiers, because power consumption of the amplification circuits is large. A wake-up signal is used to reduce power consumption. However, in the structure of the conventional apparatus for receiving a wake-up signal, all portions of a circuit for transmitting and receiving the wake-up signal are turned on to detect the wake-up signal and thus there is a limit in realizing low power.

Thus, in the current embodiment, the duty cycled manner is used so as to reduce power consumption. In addition to this, the amplification circuits are divided into the first and second amplifiers so that power consumption may be minimized.

The interrupt generating unit 340 generates an interrupt that transits the state of a node to the wake-up state from the sleep state based on the detected wake-up signal (S450).

Figure 5:
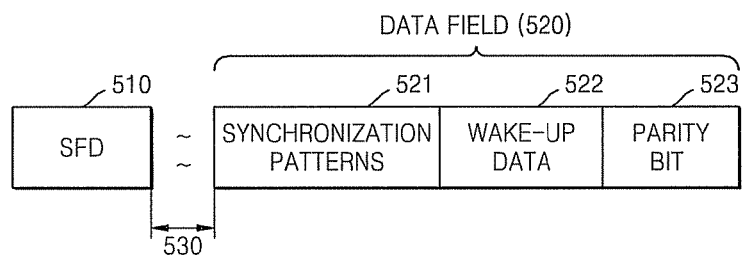
FIG. 5 illustrates the structure of a frame of a wake-up signal according to an embodiment of the present invention.

FIG. 5 illustrates the structure of a frame of a wake-up signal according to an embodiment of the present invention. Referring to FIG. 5, the frame of the wake-up signal according to the current embodiment includes an SFD field 510 and a data field 520.

The SFD field 510 is a portion that is added to a conventional frame of a wake-up signal, and contains an SFD.

The SFD is a bit string for frame synchronization indicating start of a frame in which byte rows next to the SFD are valid, and in the present invention, the SFD performs a function of indicating the wake-up signal.

The data field 520 is also included in a conventional frame of a wake-up signal, includes synchronization patterns 521, wake-up data 522, and a parity bit 523. The data field 520 is separated from the SFD field 510 of the frame of the wake-up signal at constant intervals.

The synchronization patterns 521 are generally used in Manchester coding for synchronization of the wake-up signal. The wake-up data 522 and the parity bit 523 may be Manchester decoded by detecting the synchronization patterns 521. In other words, Manchester coding is a coding manner using transitions from 1->0 and from 0->1, and thus the synchronization patterns 521 also may have values of 111000 or 000111 and may be used as patterns to be compared and as values transferring timing synchronization.

The wake-up data 522 includes a wake-up ID indicating a node to be waken up by the wake-up signal.

The parity bit 523 is used to check parity.

The reason why the SFD field 510 and the data field 520 are separated from each other at constant intervals is to provide a period of time in which the RF receiving unit 310 may be activated after an SFD is detected, considering that the RF receiving unit 310 may not be immediately activated even though detection of the SFD is successful. If the intervals are not provided, the synchronization patterns 521 cannot be detected such that timing synchronization may not be performed and most data of the wake-up signal may not be decoded.

The length SFD according to the current embodiment is longer than the synchronization patterns 521 and may have various patterns.

Thus, the SFD according to the current embodiment may be used in various purposes, and for example, nodes may be selectively wakened up by using the SFD. For example, when different SFDs are set according to groups, a wake-up signal that is used to wake-up nodes that belong to a predetermined group may be generated.

Figure 6:
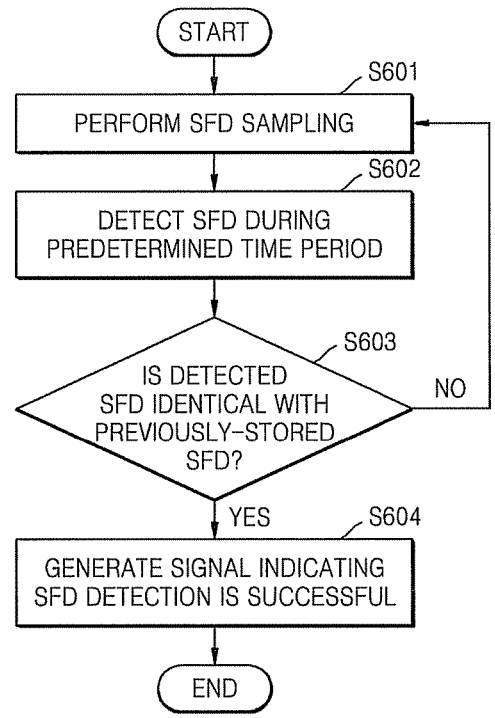
FIG. 6 is a flowchart illustrating a process of sampling a wake-up signal, wherein the method is performed in the apparatus for receiving the wake-up signal shown in FIG. 3.
Figure 7:
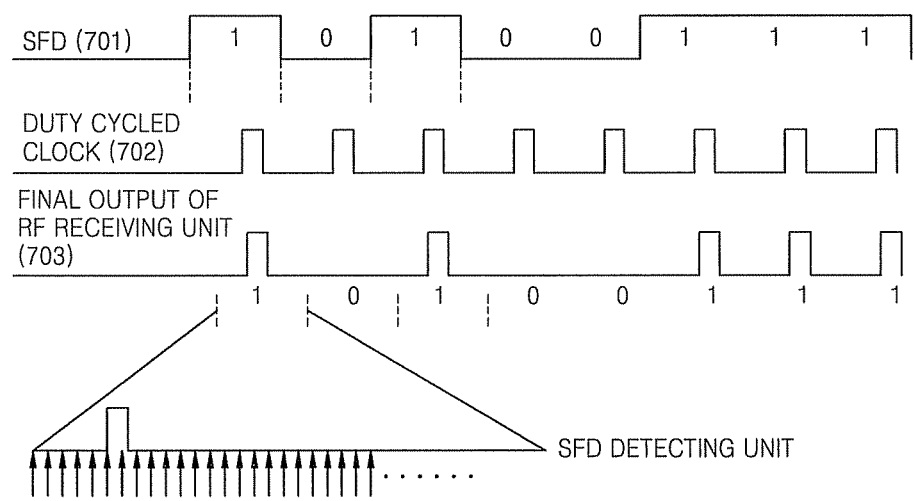
FIG. 7 illustrates an output of an RF receiving unit when the process of sampling the wake-up signal of FIG. 6 is performed.

FIG. 6 is a flowchart illustrating a process of sampling a wake-up signal, wherein the process is performed by the apparatus for receiving the wake-up signal shown in FIG. 3, and FIG. 7 illustrates an output of the RF receiving unit 310 when the process of sampling the wake-up signal of FIG. 6 is performed.

When the SFD detecting unit 320 of the apparatus for receiving a wake-up signal according to the current embodiment extracts an SFD 701 of a wake-up signal, the RF receiving unit 310 is operated for an SFD detecting time that is shorter than an SFD detecting time period repeatedly according to the predetermined SFD detecting time period that is defined by a duty cycled clock 702, and thus a final output 703 of the RF receiving unit 310 outputs some of an SFD. For example, when 1-bit of the SFD signal has a time period of 1 ms, the RF receiving unit 310 according to the current embodiment outputs the 1-bit as 10 μs.

Thus, in order to detect an SFD more exactly in the current embodiment, the SFD 701 is sampled at a larger ratio than 1 ms/10 μs (S601). SFD-sampled values are determined as bit values that constitute the SFD 701 by performing an OR operation on the SFD-sampled values for a predetermined time period, for example, for 1 ms (S602). When an SFD bit is 1 and SFD sampling is performed 250 times for 1 ms, 250 values may be obtained, and 1 may be sampled at least once for 1 ms. Thus, the resultant value of the OR operation is 1, and an SFD value is determined as 1. If the SFD bit is 0, all of 250 sampling values are 0, and a value that is obtained by performing the OR operation on the sampled values is 0, and thus the SFD value is determined as 0.

A bit string of the SFD 701 is determined by sampling the SFD value and the OR operation on the sampled values, and the detected SFD is compared to a previously-stored SFD by performing an XNOR operation (S603). If the detected SFD is identical to the previously-stored SFD, a signal indicating that detection of the SFD is successful is generated (S604).

Figure 8:
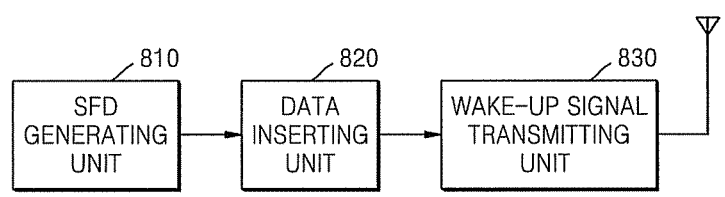
FIG. 8 illustrates an apparatus for transmitting a wake-up signal according to an embodiment of the present invention.
Figure 9:
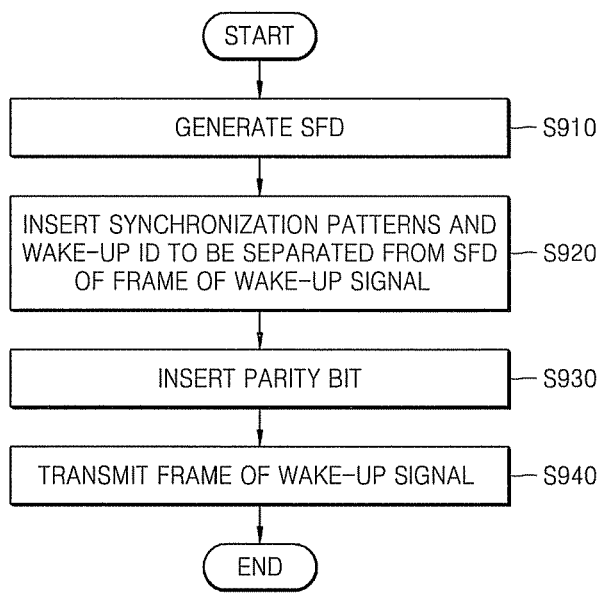
FIG. 9 is a flowchart illustrating a method of transmitting a wake-up signal, wherein the method is performed in the apparatus for transmitting the wake-up signal shown in FIG. 8, according to an embodiment of the present invention.

FIG. 8 illustrates an apparatus for transmitting a wake-up signal according to an embodiment of the present invention, and FIG. 9 is a flowchart illustrating a method of transmitting a wake-up signal, wherein the method is performed in the apparatus for transmitting the wake-up signal shown in FIG. 8, according to an embodiment of the present invention.

Referring to FIG. 8, the apparatus for transmitting the wake-up signal according to the current embodiment includes an SFD generating unit 810, a data inserting unit 820, and a wake-up signal transmitting unit 830.

The SFD generating unit 810 generates an SFD indicative of a wake-up signal that is used to wake-up a node in a sleep mode (S910).

The data inserting unit 820 inserts synchronization patterns for synchronizing the wake-up signal and a wake-up ID indicative of a node to be waken up by the wake-up signal in a data field of a frame of the wake-up signal, which is separated from the SFD of the frame of the wake-up signal at constant intervals (S920).

And the data inserting unit 820 inserts a parity bit to the data field of the frame of the wake-up signal (S930).

The wake-up signal transmitting unit 830 transmits a frame of the wake-up signal (S940).

Figure 10:
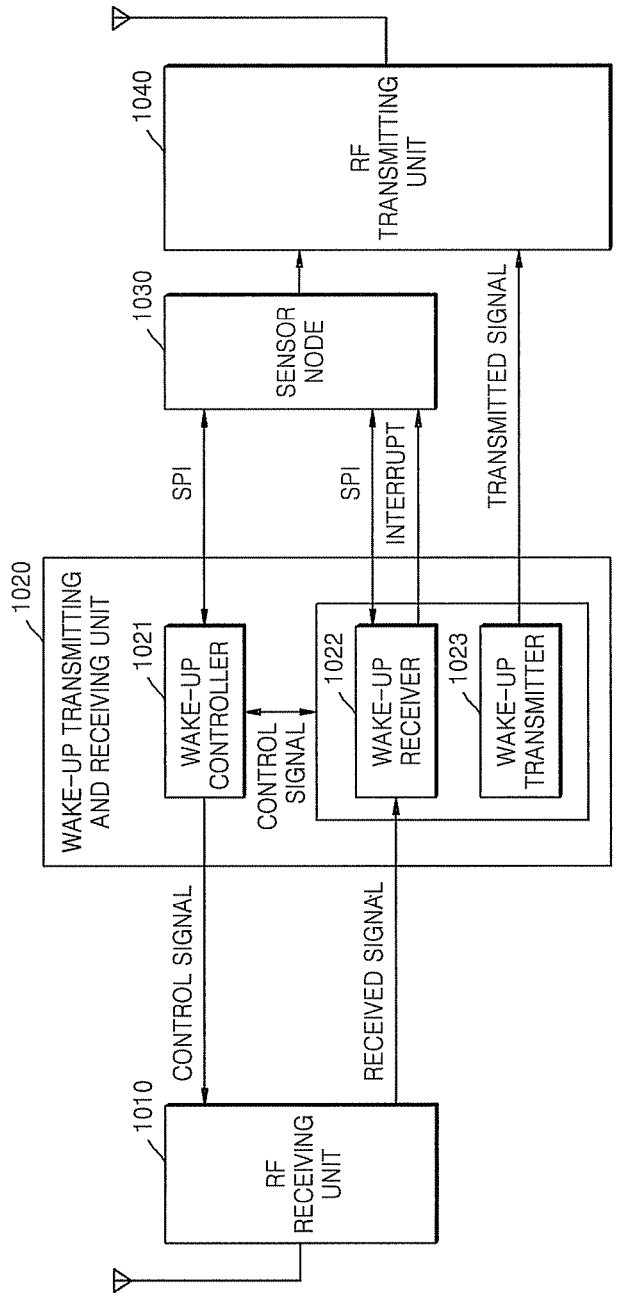
FIG. 10 illustrates an apparatus for transmitting and receiving a wake-up signal according to an embodiment of the present invention.

FIG. 10 illustrates an apparatus for transmitting and receiving a wake-up signal according to an embodiment of the present invention, wherein the apparatus for transmitting and receiving a wake-up signal includes the apparatus for receiving the wake-up signal shown in FIG. 3 and the apparatus for transmitting the wake-up signal shown in FIG. 8.

Sensor nodes connected to the apparatus for transmitting and receiving a wake-up signal according to the current embodiment are in a sleep mode, excluding a circuit that senses an interrupt signal generated by the apparatus for transmitting and receiving the wake-up signal, and a portion of the apparatus for transmitting and receiving the wake-up signal operates periodically for a predetermined amount of time, and only when a predetermined signal is detected, all circuits are waken up so as to receive the wake-up signal and to generate an interrupt. By using the above structure, power consumption that is used to receive the wake-up signal may be minimized.

The apparatus for transmitting and receiving the wake-up signal according to the current embodiment pursues low power while maintaining the reliability of the wake-up signal, and thus is implemented by an OOK modulation method and Manchester coding in which a simple circuit is used and in which synchronization is easily performed. However, the present invention is not limited to the modulation method and the coding method.

Referring to FIG. 10, the apparatus for transmitting and receiving the wake-up signal according to the current embodiment includes an RF receiving unit 1010, a wake-up transmitting and receiving unit 1020, a sensor node 1030, and an RF transmitting unit 1040.

A frame of a wakeup signal, such as that of the wake-up signal shown in FIG. 5, is received by the wake-up transmitting and receiving unit 1020 via an antenna and the RF receiving unit 1010.

The wake-up transmitting and receiving unit 1020 includes a wake-up controller 1021, a wake-up receiver 1022, and a wake-up transmitter 1023.

The wake-up controller 1021 transmits a control signal to each of the RF receiving unit 1010, the wake-up receiver 1022, and the wake-up transmitter 1023 and controls them.

The wake-up receiver 1022 detects a wake-up signal from a signal that is received by the RF receiving unit 1010 and compares a wake-up ID of the detected wake-up signal to a previously-stored wake-up ID. If the wake-up ID of the detected wake-up signal is identical to the previously-stored wake-up ID, the wake-up receiver 1022 generates an interrupt that is used to wake-up the sensor node 1030 and transmits the interrupt to the sensor node 1030.

The wake-up transmitter 1023 generates the wake-up signal when the wake-up transmitter 1023 is to wake-up another node, generates the frame of the wake-up signal, and transmits the frame to the RF transmitting unit 1040 and the antenna. Here, an RF circuit embedded in the sensor node 1030 may be used as the RF transmitting unit 1040.

The wake-up transmitting and receiving unit 1020 according to the current embodiment may be connected to the sensor node 1030 via serial peripheral interface (SPI) communication and may transmit and receive a wake-up signal to be transmitted, a wake-up signal to be compared during reception, various control signals, etc.

Figure 11:
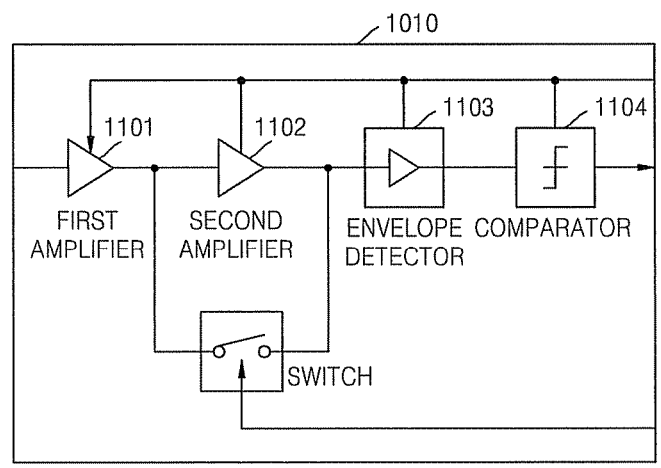
FIG. 11 illustrates an RF receiving unit of the apparatus for transmitting and receiving the wake-up signal shown in FIG. 10.

FIG. 11 illustrates the RF receiving unit 1010 of the apparatus for transmitting and receiving the wake-up signal shown in FIG. 10. Referring to FIG. 11, the RF receiving unit 1010 according to the current embodiment includes a first amplifier 1101, a second amplifier 1102, an envelope detector 1103, and a comparator 1104.

In the current embodiment, the envelope detecting unit 1103 and the comparator 1104 perform the same function as that of the envelope detector 112 and the comparator 113 of the conventional apparatus for receiving the wake-up signal of FIG. 1, respectively.

On the other hand, in contrast to the conventional apparatus for receiving the wake-up signal of FIG. 1, a plurality of amplification circuits performing an amplification function are divided into the first amplifier 1101 and the second amplifier 1102, wherein the first amplifier 1101 operates at normal times and both the first amplifier 1101 and the second amplifier 1102 operate when an SFD is detected.

The level of amplification when the wake-up ID is to be detected, which is relatively more important than when the SFD is to be detected, is increased so as to improve the reliability of detecting the wake-up signal.

Figure 12:
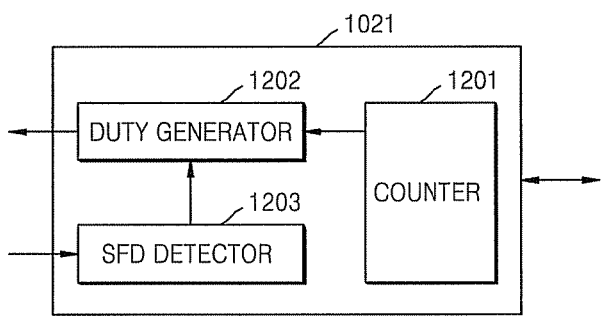
FIG. 12 illustrates a wake-up controller of the apparatus for transmitting and receiving the wake-up signal shown in FIG. 10.

FIG. 12 illustrates the wake-up controller 1021 of the apparatus for transmitting and receiving the wake-up signal shown in FIG. 10. Referring to FIG. 12, the wake-up controller 1021 according to the current embodiment includes a counter 1201, a duty generator 1202, and an SFD detector 1203.

The counter 1201 operates the duty generator 1202 periodically.

The duty generator 1202 generates and transmits a control signal that is used to supply power to a portion of the apparatus for transmitting and receiving the wake-up signal, to be driven for a predetermined amount of time for a predetermined time period, so as to periodically receive a portion of the wake-up signal output from the first amplifier 1101 of the RF receiving unit 1010, the envelope detector 1130, and the comparator 1104. In addition, after an SFD is detected, the duty generator 1202 generates and transmits a control signal that is used to continuously supply power to the first amplifier 1101, the second amplifier 1102, and the envelope detector 1103 of the RF receiving unit 1010, and all elements of the RF receiving unit 1010.

The SFD detector 1203 detects an SFD from a signal that is received by the RF receiving unit 1010 operating for a predetermined amount of time for a predetermined time period, notifies detection of the SFD to the duty generator 1202 and the wake-up receiver 1022, turns on the RF receiving unit 1010 and the wake-up receiver 1022 and operates them.

Figure 13:
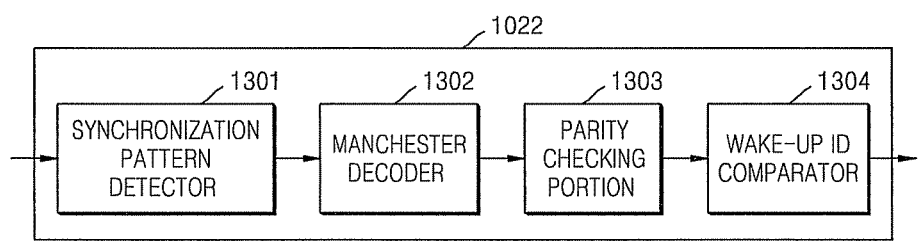
FIG. 13 illustrates a wave-up receiver of the apparatus for transmitting and receiving the wake-up signal show in FIG. 10.

FIG. 13 illustrates the wave-up receiver 1022 of the apparatus for transmitting and receiving the wake-up signal shown in FIG. 10. Referring to FIG. 13, the wake-up receiver 1022 includes a synchronization pattern detector 1301, a Manchester decoder 1302, a parity checking portion 1303, and a wake-up ID comparator 1304.

If a signal notifying detection of an SFD is received from the wake-up controller 1021, power is supplied to the wake-up receiver 1022, and the wake-up receiver 1022 receives all elements of the frame of a wake-up signal, i.e., those of the wake-up signal having the structure of FIG. 5, from the RF receiving unit 1010.

The synchronization pattern detector 1301 detects synchronization patterns.

The Manchester decoder 1302 extracts a parity bit and wake-up data by performing Manchester decoding if detection of the synchronization patterns is successful.

The parity checking portion 1302 checks parity, and the wake-up ID comparator 1304 checks parity and extracts the wake-up ID from the wake-up data if checking of the parity is successful.

The wake-up ID comparator 1304 checks whether the extracted wake-up ID and a previously-stored wake-up ID are identical to each other, and if the extracted wake-up ID and the previously-stored wake-up ID are identical to each other, the wake-up ID comparator 1304 transmits an interrupt that is used to wake-up the sensor node 1030 and transmits an initialization signal to the wake-up controller 1021.

Figure 14:
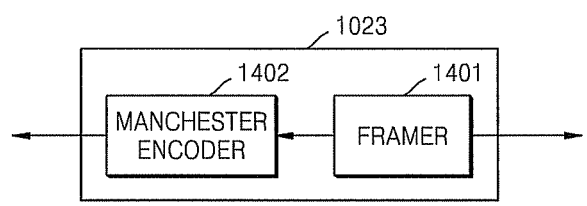
FIG. 14 illustrates a wake-up transmitter of the apparatus for transmitting and receiving the wake-up signal shown in FIG. 10.

FIG. 14 illustrates the wake-up transmitter 1023 of the apparatus for transmitting and receiving the wake-up signal shown in FIG. 10. Referring to FIG. 14, the wake-up transmitter 1023 includes a framer 1401 and a Manchester encoder 1402.

The wake-up transmitter 1023 is used to wake-up another sensor node, forms a frame of the wake-up signal having the structure of FIG. 3 by using the framer 1401, encodes the wake-up signal in a Manchester coding manner by using the Manchester encoder 1402, and transmits the frame of the wake-up signal to another sensor node through the RF transmitting unit 1040 and the antenna.

FIG. 15 is a flowchart illustrating a process of waking-up the sensor node 1030 by receiving the wake-up signal, wherein the process is performed by the apparatus for transmitting and receiving the wake-up signal shown in FIG. 10.

Referring to FIG. 15, the wake-up controller 1021 turns off the second amplifier 1102 of the RF receiving unit 1010, the wake-up receiver 1022, and the wake-up transmitter 1023 (S1501).

The wake-up controller 1021 supplies power to elements of the RF receiving unit 1010, i.e., the first amplifier 1101, the envelope detector 1103, and the comparator 1104 of the RF receiving unit 1010 for a predetermined time period so as to receive the wake-up signal in a duty cycled manner (S1502).

The RF receiving unit 1010 receives some of the wake-up signal, and the SFD detector 1203 of the wake-up controller 1021 performs sampling of some of the wake-up signal and detects the SFD (S1503).

If detection of the SFD has failed in operation S1503, the process returns to operation S1502 of supplying power to the first amplifier 1101, the envelope detector 1103, and the comparator 1104 of the RF receiving unit 1010 for a predetermined time period.

If detection of the SFD is successful in operation S1503, the wake-up controller 1021 supplies power to all elements of the RF receiving unit 1010 and the wake-up receiver 1022 (S1504).

If the wake-up controller 1021 supplies power to the first amplifier 1101, the second amplifier 1102, the envelope detector 1103, and the comparator 1104 of the RF receiving unit 1010 continuously, the RF receiving unit 1010 receives the wake-up signal in a complete form, and the synchronization pattern detector 1301 of the wake-up receiver 1022 detects synchronization patterns from the received wake-up signal (S1505).

If detection of the synchronization patterns has failed in operation S1505, the process returns to operation S1052 of supplying power to the first amplifier 1101, the envelope detector 1103, and the comparator 1104 of the RF receiving unit 1010.

If detection of the synchronization patterns is successful in operation S1505, the Manchester decoder 1302 starts Manchester decoding and extracts a wake-up ID and a parity bit (S1506).

If the parity checking portion 1303 successfully checks parity by using a parity bit, the wake-up ID comparator 1304 compares the previously-stored wake-up ID to the extracted wake-up ID to determine whether they are identical to each other (S1507).

If the wake-up ID is identical to a previously-stored wake-up ID, the wake-up ID comparator 1304 generates an interrupt that is used to wake-up the sensor node 1030 (S1508).

In addition, the wake-up ID comparator 1304 may return to operation S1501 of generating an interrupt and then transmit an initialization signal to the wake-up controller 1021 and turning off the second amplifier 1102 of the RF receiving unit 1010, the wake-up receiver 1022, and the wake-up transmitter 1023.

Various elements of the apparatus for receiving the wake-up signal shown in FIG. 3 and the apparatus for transmitting the wake-up signal shown in FIG. 6 can be realized separately from a computer system or while being integrated to the computer system, and the computer system includes at least one main unit connected to both an output device for displaying information to a user and an input device for receiving an input from the user. The main unit may include a processor connected to a memory system via a mutual connection mechanism. Both the input device and the output device are connected to the processor and the memory system via the mutual connection mechanism.

In addition, the apparatus for receiving the wake-up signal shown in FIG. 3 and the apparatus for transmitting the wake-up signal shown in FIG. 6 generally include a computer readable medium having a predetermined shape. The computer readable medium can be a medium that can be accessed by another computing device in asset management. The computer readable medium is not limited to the medium, and for example, the computer readable medium can be a computer recording medium and a communication medium. The computer recording medium includes volatile and non-volatile computer recording mediums and detachable and fixing computer recording mediums, which are realized by a method or technology so as to store information such as a computer readable command, a data structure, a program module or other data. The computer recording medium includes RAM, ROM, EEPROM, flash memory or other memory technologies, CD-ROM. DVD or other optical storage devices, a magnetic cassette, a magnetic tape, a magnetic disk storage device or other magnetic storage devices, and a medium that can be used to store other necessary information and can be accessed by the computing device in an asset management system. The computer recording medium is not limited to this. The communication medium realizes a computer readable command, a data structure, a program module or other data as modulation data signals, for example, other transmission mechanisms, includes data as modulation data signals such as other transmission mechanisms, and includes an arbitrary information transmission medium. The communication medium is not limited to this, and includes a wired medium such as a wired network or direct-wired connection and a wireless medium such as sound, radio frequency (RF), infrared rays, and other wireless mediums. A combination of the above-mentioned elements may be included in a region of the computer readable medium.

One or more output devices may be connected to a computer system. Examples of the output devices include a cathode ray tube (CRT) display, a liquid crystal display (LCD), other video output devices, a printer, a communication device such as a modem, a storage device such as a disk or a tape, and audio inputs. One or more input devices may be connected to the computer system. Examples of the input devices include a keyboard, a keypad, a track ball, a mouse, a pen and a tablet, a communication device, and a data input device such as an audio and video capture device. The present invention is not limited to a predetermined input or output device that is used in combination with the computer system, or the input or output device disclosed in the present specification.

The computer system may be a general-purpose computer system in which programming is performed by using computer programming languages such as SmallTalk, C++, Java, Ada, C#(C-Sharp) or programming languages such as other script languages or assembly languages. Various features of the present invention may be realized in the non-program environment (for example, documents that are generated in a HTML, an XML or other formats that render the features of a graphic user interface or perform other functions when viewed from the Windows of a browser program). Various features of the present invention may be realized by program or non-program elements or a combination thereof. The computer system may also be specially-programmed, special-purpose hardware or an application specific integrated circuit (ASIC). A reader system may include a pager, a telephone, a PDA, or other electronic data communication devices.

In the general-purpose communication system, a processor is generally a processor that can be used in the industrial field, such as the famous Pentium processor manufactured by the Intel Corporation, or other processors that perform operating systems, such as Windows 95, Windows 98, Windows NT, Windows 2000, or Windows XP, which are manufactured by the Microsoft Corporation, a MAC OS System X manufactured by the Apple Computer, a Solaris Operating System manufactured by the Sun Microsystems, or UNIX from various sources. Many other operating systems may be used.

A computer platform in which an application program is recorded in a high-level programming language, is defined by a processor and an operating system. The present invention is not limited to a predetermined computer system platform, a processor, an operating system, or a network. In addition, it will be understood by those of ordinary skill in the art that the present invention is not limited to a predetermined programming language or computer system. In addition, other appropriate programming languages or other appropriate computer systems may be used.

One or more portions of the computer system may be distributed to one or more computer systems (not shown) connected to a communication network. The computer systems may be general-purpose computer systems. For example, various features of the present invention may be distributed to one or more computer systems that are constituted to provide a service to one or more client computers (for example, a server) or are constituted to perform an overall task as a portion of a distribution system. For example, various features of the present invention may be realized on a client-server system including components that are distributed between one or more server systems that perform various functions according to various embodiments of the present invention. These components may be executable intermediate codes (for example, IL) or interpreted codes (for example, Java) in which communication is performed in a communication network (for example, the Internet) by using a communication protocol (for example, TCP/IP).

The present invention is not limited to being performed in a predetermined system or system group. In addition, the present invention is not limited to a predetermined architecture, network or communication protocol.

As described above, an RF receiving unit that monitors a wake-up signal is operated only for a predetermined amount of time, or only a predetermined portion of the RF receiving unit is operated for a predetermined amount of time so that power consumed to receive the wake-up signal may be remarkably reduced, and a wireless sensor network system including high-reliability and ultra-low power sensor nodes may be implemented.

While the present invention has been particularly shown and described with reference to exemplary embodiments thereof, it will be understood by those of ordinary skill in the art that various changes in form and details may be made therein without departing from the spirit and scope of the present invention as defined by the following claims. In particular, many examples represented in the present specification are associated with predetermined method operations or a combination of system elements. However, these operations and these elements may be combined by using another method that achieves the same purpose. It is not intended that operations, elements, and features related to any one embodiment are excluded from similar roles in another embodiment. In addition, changing of elements of the claim by using "first" or "second" ordinal expressions in the claim is not to imply any priority or order, or not to imply that any element of other claims is prior to another element, or not to imply a temporal sequence in which method operations are performed, but is to discriminate one element of the claims having a predetermined name from another element having the same name as the name of the one element (except for using an ordinal item) and may be used as a label for discriminating elements of the claims from one another.

What is claimed is:

1. An apparatus for receiving a wake-up signal, the apparatus comprising:
    an amplifier unit including at least two amplifying portions;
    a radio frequency (RF) receiving unit receiving a wireless signal through an antenna;
    a start of frame delimiter (SFD) detecting unit detecting an SFD to indicate that the received wireless signal is a wake-up signal that is used to wake-up a node in a sleep mode, by operating the RF receiving unit during an SFD detecting time, wherein the SFD detecting time is shorter than a predetermined SFD detecting time period; and
    a wake-up signal detecting unit detecting the wake-up signal by continuously operating the RF receiving unit when the SFD is detected,
    wherein less than all of the at least two amplifying portions are operated prior to the SFD being detected and all of the at least two amplifying portions are operated after the SFD is detected, and
    wherein the SFD detecting unit samples values of the wireless signal that is received by the RF receiving unit a number of times that is larger than a ratio that is obtained by dividing the predetermined SFD detecting time period by the SFD detecting time and extracts a value that is obtained by performing an OR operation on the sampled values.

2. The apparatus of claim 1, further comprising an interrupt generating unit generating an interrupt that transits a state of the node to a wake-up state from a sleep state based on the detected wake-up signal.

3. The apparatus of claim 1, wherein the SFD detecting unit operates a portion of the at least two amplifying portions.

4. The apparatus of claim 3, wherein the wake-up signal detecting unit operates all of the at least two amplifying portions.

5. The apparatus of claim 1, wherein, when the extracted value is identical to a previously stored SFD, the SFD detecting unit detects the extracted value as an SFD of the wake-up signal.

6. The apparatus of claim 1, wherein a frame of the wake-up signal comprises a SFD field comprising the SFD, and a data field comprising synchronization patterns for synchronizing the wake-up signal and a wake-up identifier (ID) to indicate a node to be waken up by the wake-up signal, and wherein the data field is separated from the SFD field at constant intervals.

7. The apparatus of claim 1, wherein the wake-up signal detecting unit comprises:
- a synchronization pattern detector detecting synchronization patterns of the wake-up signal from the data field of the wake-up signal; and
- a wake-up ID detector detecting the wake-up ID from the data field of the wake-up signal when the synchronization patterns of the wake-up signal are detected.

8. A method of receiving a wake-up signal, the method comprising:
- operating a radio frequency (RF) receiving unit that receives a wireless signal through an antenna during an SFD detecting time, the RF receiving including an amplifier unit having at least two amplifying portions, wherein the SFD detecting time is shorter than a predetermined SFD detecting time period, according to the predetermined SFD detecting time period and detecting a start of frame delimiter (SFD) to indicate that the received wireless signal is a wake-up signal that is used to wake-up a node in a sleep mode;
- detecting the wake-up signal by continuously operating the RF receiving unit when the SFD is detected; and
- operating less than all of the at least two amplifying portions prior to the SFD being detected and operating all of the at least two amplifying portions after the SFD is detected, wherein the detecting of the SFD comprises:
- sampling values of the wireless signal that is received by the RF receiving unit a number of times that is larger than a ratio that is obtained by dividing the predetermined SFD detecting time period by the SFD detecting time; and
- extracting a value that is obtained by performing an OR operation on the sampled values.

9. The method of claim 8, further comprising generating an interrupt that transits a state of the node to a wake-up state from a sleep state based on the detected wake-up signal.

10. The method of claim 8, wherein the detecting of the SFD comprises operating a portion of the at least two amplifying portions.

11. The method of claim 8, wherein the detecting of the wake-up signal comprises operating all of the at least two amplifying portions.

12. The method of claim 8, wherein, when the extracted value is identical to a previously stored SFD, the detecting of the SFD comprises detecting the extracted value as an SFD of the wake-up signal.

13. The method of claim 8, wherein a frame of the wake-up signal comprises a SFD field comprising the SFD, and a data field comprising synchronization patterns for synchronizing the wake-up signal and a wake-up ID to indicate of a node to be waken up by the wake-up signal, and wherein the data field is separated from the SFD field at constant intervals.

14. The method of claim 8, wherein the detecting of the wake-up signal comprises:
- detecting synchronization patterns of the wake-up signal; and
- detecting the wake-up ID from the data field of the wake-up signal when the synchronization patterns of the wake-up signal are detected.

\* \* \* \* \*